(12) United States Patent
Chang et al.

(10) Patent No.: US 10,395,038 B2
(45) Date of Patent: Aug. 27, 2019

(54) SYSTEM AND METHOD FOR AUTOMATIC RECOVERY OF FIRMWARE IMAGE

(71) Applicant: QUANTA COMPUTER INC., Taoyuan (TW)

(72) Inventors: Ying-Che Chang, Taoyuan (TW); Kung-Lung Tsai, Taoyuan (TW); Wen-Hua Lo, Taoyuan (TW); Chung-Hung Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/886,425

(22) Filed: Feb. 1, 2018

(65) Prior Publication Data
US 2019/0236277 A1   Aug. 1, 2019

(51) Int. Cl.
| | | |
|---|---|---|
| G06F 9/44 | (2018.01) | |
| G06F 21/57 | (2013.01) | |
| G06F 21/64 | (2013.01) | |
| G06F 8/654 | (2018.01) | |

(52) U.S. Cl.
CPC .......... *G06F 21/572* (2013.01); *G06F 8/654* (2018.02); *G06F 21/64* (2013.01)

(58) Field of Classification Search
CPC ........ G06F 21/572; G06F 21/45; G06F 21/60; G06F 21/64
USPC ................................................ 717/168–177
See application file for complete search history.

(56) References Cited

U.S. PATENT DOCUMENTS

| | | | | |
|---|---|---|---|---|
| 5,579,522 A | * | 11/1996 | Christeson | G06F 8/65 713/2 |
| 5,878,256 A | * | 3/1999 | Bealkowski | G06F 11/1433 711/103 |
| 6,167,567 A | * | 12/2000 | Chiles | G06F 9/454 717/173 |
| 6,337,954 B1 | * | 1/2002 | Soshi | G03B 17/18 349/142 |
| 6,904,457 B2 | * | 6/2005 | Goodman | G06F 8/65 709/220 |
| 7,055,148 B2 | * | 5/2006 | Marsh | G06F 8/65 713/2 |
| 7,318,151 B1 | * | 1/2008 | Harris | G06F 21/572 713/100 |
| 7,996,829 B2 | * | 8/2011 | Depew | G06F 8/65 717/168 |
| 8,214,653 B1 | * | 7/2012 | Marr | G06F 21/572 713/189 |

(Continued)

OTHER PUBLICATIONS

Kim et al, "Remote Progressive Firmware Update for Flash-Based Networked Embedded Systems", ACM, pp. 407-412, 2009 (Year: 2009).*

(Continued)

*Primary Examiner* — Anil Khatri
(74) *Attorney, Agent, or Firm* — Nixon Peabody LLP; Zhou Lu (57) ABSTRACT

A system and method for automatic recovery of a firmware image is disclosed. The method can include creating a shadow firmware image in a storage device from a firmware image in non-volatile memory. It is determined whether an abnormal event affecting the firmware image has occurred. The shadow firmware image is recovered from the storage device. The shadow firmware image is copied to the non-volatile memory.

13 Claims, 5 Drawing Sheets

(56) References Cited

U.S. PATENT DOCUMENTS

| | | | | |
|---|---|---|---|---|
| 8,589,302 B2* | 11/2013 | Prakash | ............... | G06F 21/572 |
| | | | | 705/50 |
| 8,601,170 B1* | 12/2013 | Marr | .................... | G06F 21/572 |
| | | | | 710/15 |
| 8,881,308 B2* | 11/2014 | Baltes | ...................... | G06F 8/61 |
| | | | | 713/1 |
| 8,887,144 B1* | 11/2014 | Marr | ........................ | G06F 8/65 |
| | | | | 717/168 |
| 10,097,563 B2* | 10/2018 | Surdu | .................. | G06F 21/105 |
| 10,101,928 B2* | 10/2018 | Nijhawan | ............. | G06F 3/0619 |
| 2012/0110379 A1 | 5/2012 | Shao et al. | | |
| 2013/0036300 A1 | 2/2013 | Baik et al. | | |
| 2017/0109235 A1 | 4/2017 | Hung | | |

OTHER PUBLICATIONS

Park et al, Non-Invasive Rapid and Efficient Firmware Update for Wireless Sensor Networks, ACM, pp. 147-150, 2014 (Year: 2014).*
Brown et al, "Towards Detection of Modified Firmware on Solid State Drives via Side Channel Analysis", ACM, pp. 1-6 (Year: 2018).*
Le et al, "Binding Hardware and Software to Prevent Firmware Modification and Device Counterfeiting", ACM, 70-81 (Year: 2016).*
Mayama et al, "Design of Firmware Update System of RT-Middleware for Embedded System", IEEE, pp. 2818-2822 (Year: 2010).*
Jain et al, "Infield Firmware Update: Challenges and Solutions", IEEE, pp. 1232-1236 (Year: 2016).*
Extended European Search Report for EP Application No. 18194758.1, dated Jun. 21, 2019.

* cited by examiner

SYSTEM AND METHOD FOR AUTOMATIC RECOVERY OF FIRMWARE IMAGE

TECHNICAL FIELD

The present disclosure relates generally to recovery of firmware. More particularly, aspects of this disclosure relate to an automatic recovery system for firmware image in a computer device.

BACKGROUND

A typical computer will include a variety of hardware circuit modules such as processors, baseboard memory controllers, interface components, memory, etc. The computer is programming instructions that allow a computer to perform different functions. Firmware is specialized programing instructions that provide the low-level control for the specific hardware of the device. Firmware is typically stored in non-volatile memory devices such as read only memory (ROM), erasable programmable read only memory (EPROM), or flash memory. The firmware is typically executed by a main chip, such as a central processing unit or baseboard management controller. In order to function efficiently, firmware in permanent memory allows a main chip, such as a processor, ready and rapid access to critical operating instructions to control the components in the computer.

The advantage of firmware embodied as hardwired circuitry is that rapid access and execution is possible. Traditionally, changing the firmware of a device is infrequent at best, given the hardwired circuitry. For example, traditional firmware memory devices, such as ROM, have permanent circuits installed and cannot be changed after manufacture. Recently, firmware has been stored on erasable non-volatile memory such as an electronically erasable programmable read only memory (EEPROM). Such types of memory retain the hardware nature of previous memory devices, thereby allowing rapid access and execution of the firmware. However, the erasable nature of the memory allows upgrades or correcting errors in firmware, without having to replace the entire memory device.

In a computer system, the main chip, such as a central processing unit (CPU), baseboard management controller (BMC), or micro-controller unit (MCU), runs the firmware to control the overall system. The firmware is designed to ensure the computer system works normally. The term "firmware image" is defined as a copy of the firmware code stored in the non-volatile memory. In abnormal events, such as an interruption to the power up sequence, the main chip will log the abnormal event to inform a user of a potential malfunction. In some cases, an abnormal event may cause the firmware image to crash. For example, in the case of a power loss during the loading of the firmware image to the main chip, an updated firmware image or an uncertain firmware image may not be loaded properly. In such cases, the inability to access the firmware image by the main chip prevents a successful boot, and therefore system operation cannot be performed.

Thus, there is a need for a system that allows automatic recovery of a firmware image in the event of a power loss. There is a further need for a system that allows the storage of a firmware image in other memory for automatic recovery of the firmware image. There is another need for a system that allows automatic storage of a backup firmware image when the firmware image is updated.

SUMMARY

One disclosed example is a method of recovering a firmware image in a computer device. A shadow firmware image is created in a storage device from a firmware image in non-volatile memory. It is determined whether an abnormal event affecting the firmware image has occurred. The shadow firmware image is recovered from the storage device. The shadow firmware image is copied to the non-volatile memory.

Another disclosed example is an electronic computer device. The device includes a non-volatile memory storing a firmware image. The device includes a main chip executing the firmware image. The device includes a storage device storing a shadow firmware image. The device includes a control circuit operable to create the shadow firmware image in the storage device from the firmware image in non-volatile memory. The control circuit is operable to determine whether an abnormal event affecting the firmware image has occurred. The control circuit is operable to recover the shadow firmware image from the storage device. The control circuit is operable to copy the shadow firmware image to the non-volatile memory.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections—but not explicitly set forth in the claims—should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Figure 1:
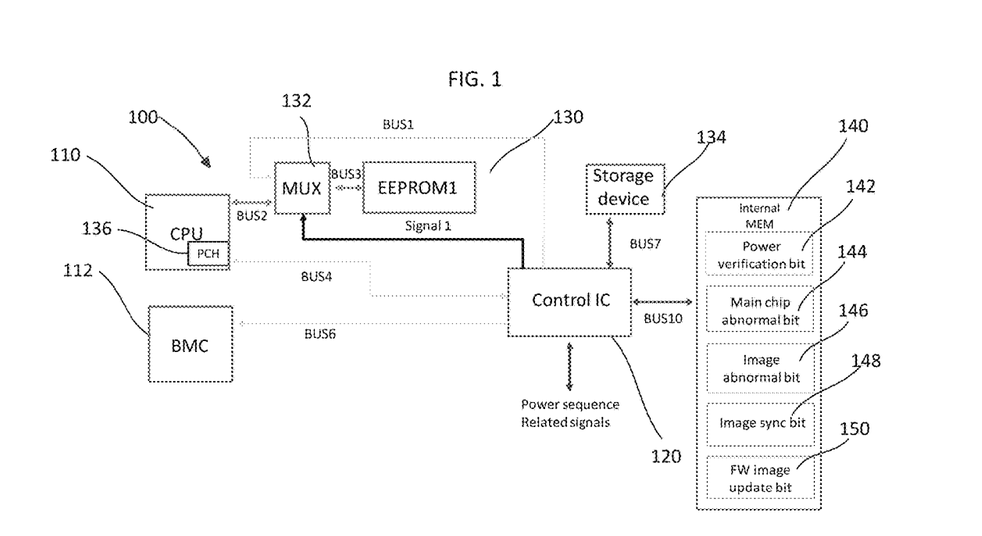
FIG. 1 is a block diagram of an example computer device with a firmware image automatic recovery system.

FIG. 1 is a block diagram of a computer device 100 that includes an example automatic firmware image recovery system. The computer device 100 includes a central processing unit (CPU) 110 and a baseboard management controller (BMC) 112. The automatic recovery system in this example is operated by a control integrated circuit 120. A system bus allows data and commands to be exchanged between device components and the main chips, such as the CPU 110, BMC 112, and control integrated circuit 120. A firmware image is stored in a permanent, non-volatile memory, such as an EEPROM 130. A multiplexer (MUX) 132 is controlled by the control circuit 120 to select signals sent between the EEPROM 130 and the CPU 110. The control circuit 120 is coupled to a storage device 134. The storage device 134 may be a permanent storage device such as flash memory or a hard disk drive. In this example, the storage device 134 may store a copy of the firmware image stored in the EEPROM 130. The stored copy is termed a shadow firmware image. In this example, a platform controller hub (PCH) 136 is a component of the CPU 110. Alternatively, the PCH 136 may be a separate circuit independent from the CPU 110.

The control circuit 120 includes an internal memory 140. The internal memory 140 is contained entirely within the control circuit 120. The internal memory 140 allows rapid access to data that assists in the operation of the control circuit 120. In this example, the internal memory 140 includes a series of status bits that allows the control circuit 120 to determine the status of the device 100. The status bits stored in the internal memory 140 include a power verification bit 142, a chip abnormal bit 144, an image abnormal bit 146, an image sync bit 148, a firmware update bit 150. A main chip, such as the CPU 110 or the control circuit 120, sets the power verification bit 142, to inform the control circuit 120 whether power on to the device 100 was successful. The chip abnormal bit 144 indicates that the firmware image stored in the EEPROM 130 is correct, but that the main chip cannot be powered on. The image abnormal bit 146 indicates the firmware image stored in the EEPROM 130 is incorrect because the main chip cannot power on. The image sync bit 148 indicates whether the firmware image in the EEPROM 130 is the same as the shadow firmware image stored in the storage device 134. In this example, a "1" in the image sync bit 148 indicates the shadow firmware image in the storage device 134 is the same as the firmware image in the EEPROM 130. A "0" in the image sync bit 148 indicates the shadow firmware image in the storage device 134 is not the same as the firmware image in the EEPROM 130. For example, a firmware update will result in setting the image sync bit 148 to a "0" value because the firmware image stored in the EEPROM 130 is updated. A "1" in the firmware bit 150 indicates an update is available, while a "0" indicates that there is no update available.

The functional components of the automatic recovery system include the control circuit 120, the EEPROM 130, the CPU 110, the BMC 112, the storage device 134, the PCH 136, and the internal memory 140. In this example, the control circuit 120 supervises the entire automatic recovery function.

The operation mechanism of the automatic recovery process for the firmware image includes four routines. First, the control circuit 120 performs a power on check routine. The power on check routine checks whether the power for the device 100 is functioning normally. Second, the control circuit 120 then performs an image shadow routine. The image shadow routine backs up the firmware image in the EEPROM 130 to the storage device 134 as a shadow firmware image. The control circuit 120 then performs an EEPROM image update routine. Third, the control circuit 120 detects whether the firmware image in the EEPROM 130 is updated. Finally, the control circuit 120 performs an image recovery routine to copy the shadow firmware image to the EEPROM 130. This recovers from any damage to the firmware image in the EEPROM 130. Alternatively, the CPU 110 may perform the functions of the automatic recovery process. Other main chips such as the BMC 112 may also perform the functions of the automatic recovery process.

Figure 2:
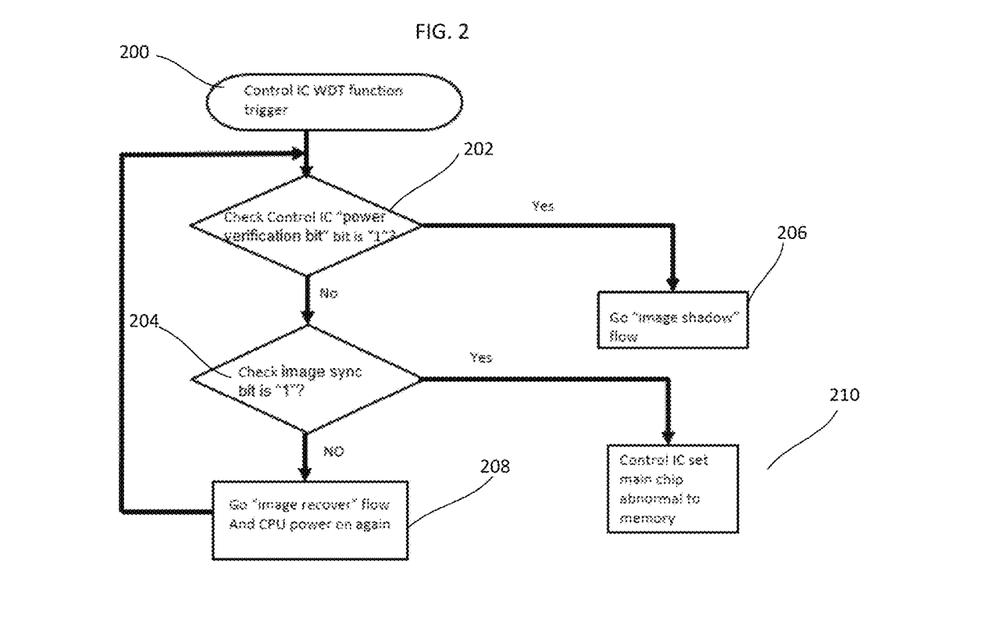
FIG. 2 is a flow diagram for the power up process of the system in FIG. 1.

FIG. 2 is a flow diagram of the power up function for the device 100 in FIG. 1. When the device 100 is powered up, the power on status indicates that the AC power is stable. The control circuit 120 starts the power on sequence, and a watch dog timer routine (200). The watch dog timer routine coordinates timing with the BIOS of the CPU 110. The watch dog timer routine has a trigger time value. As will be explained below, when the value from the watch dog timer power indicates power is ready; the start count logic to the power to the PCH 136 is ready, and the fetch of the firmware image from the EEPROM 130 is successful, the PCH 136 writes the power verification bit 142 to 1 in the control circuit 120. When system power is activated, the watch dog timer routine starts a timer count. If the timer count is less than the watch dog timer value, and a check of the power verification bit 142 shows a "1" in the power verification bit 142, this indicates that power to the PCH 136 is successful. A firmware image shadow is created. If the power verification bit 142 is 0, the power to the PCH 136 has failed. The system then recovers the firmware image.

Thus, the control circuit 120 checks the power verification bit 142 in the internal memory 140 (202). A "0" in the power verification bit 142 indicates that the CPU 110 has failed to power on. This indicates that either the CPU 110 has failed, or the firmware image in the EEPROM 130 has been compromised. The control circuit 120 then proceeds to determine if the check image sync bit 148 is "1" (204). If the power verification bit 142 is "1" in step 202, the control circuit 120 acknowledges that power is on to the CPU 110. The control circuit 120 proceeds to activate the firmware image shadow process (206). The firmware image shadow process will be discussed below in greater detail with reference to FIG. 3. Thus, if the power to the CPU 110 is operating properly and the read firmware image is completed, the control circuit 120 puts the device 100 in standby mode and performs the image shadow check process as will be explained below.

If the check image sync bit 148 is not "1" (204), indicating compromise of the firmware image in the EEPROM 130, the control circuit 120 sets the image abnormal bit 146 (in FIG. 1) to "1." The control circuit 120 then initiates the image recovery flow detailed in FIG. 4 below (208). After the image recovery flow process is completed, the control circuit 120 cycles back to check the power verification bit (202). If the check image sync bit is "1," indicating the CPU 110 has failed, the control circuit 120 sets the main chip abnormal bit 144 to "1" (210). In this example, the device 100 will inform the user of a main chip failure.

Figure 3:
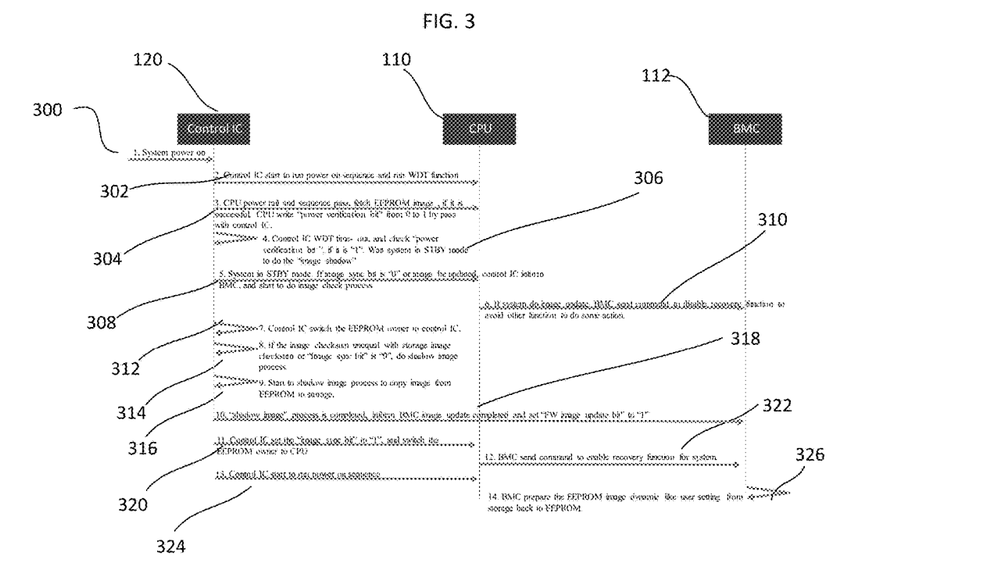
FIG. 3 is a flow diagram of the process performed by the computer device to create a shadow firmware image.

FIG. 3 is a flow diagram of the process performed by the CPU 110, the BMC 112 and the control circuit 120 (in FIG. 1), to create a shadow firmware image, as referenced in step 206 in FIG. 2. When the device 100 is powered up, the power on status indicates that the AC power is stable (300). The control circuit 120 starts the power on sequence and starts the power on sequence and the watch dog timer function (302). If CPU power on is successful indicating power on the rail and the power sequence is successful, the firmware image is fetched from the EEPROM 130. If the firmware image fetch is successful, the CPU 110 sets the power verification bit 142 in the internal memory 140 (in FIG. 1) to a "1" (304). The power verification bit 142 is set by the CPU 110 sending a command through the bus to the control circuit 120.

The control circuit 120 runs the watchdog timer routine and performs a time-out. The control circuit 120 checks whether the power verification bit 142 is set to "1." The control circuit 120 then waits until the device 100 is in standby mode to initiate the image shadow routine (306). After the device 100 is in standby mode, the control circuit 120 informs the baseboard management controller 112 that the control circuit 120 is initiating the image check process (308). The baseboard management controller 112 sends a command to the platform controller hub (PCH) 136 to disable the recovery function of the BMC 112 (310).

The control circuit 120 then switches the EEPROM owner to the control circuit 120 (312). The control circuit 120 then compares the checksum of the firmware image stored in the EEPROM 130 with the checksum of the firmware image stored in the storage device 134 (314). The control circuit 120 also determines whether the image sync bit 148 (in FIG. 1) is set to "0" indicating a lack of synchronization between the images (314). If the checksums are different, or the image sync bit 148 is set to "0," a shadow image needs to be created. In either instance, the control circuit 120 starts the shadow image routine (316). The shadow image routine copies the firmware image in the EEPROM 130 to the storage device 134. The shadow image routine is further detailed in reference to FIG. 5 below. When the shadow image routine is completed, the control circuit 120 informs the BMC 112 that the image update is completed (318). The control circuit 120 then switches the owner of the EEPROM 130 to the CPU 110 (320). The baseboard management controller 112 sends a command to the platform controller hub 136 to enable the recovery function of the BMC 112 (322). The control circuit 120 then starts the power sequence (324). The baseboard management controller 112 prepares the EEPROM dynamic setting to store the retrieved firmware image back into the EEPROM 130 (326). The shadow firmware image in the storage device 134 is thereby updated and reflected by confirming the firmware image in the EEPROM 130 has been copied to the storage device 134.

Figure 4:
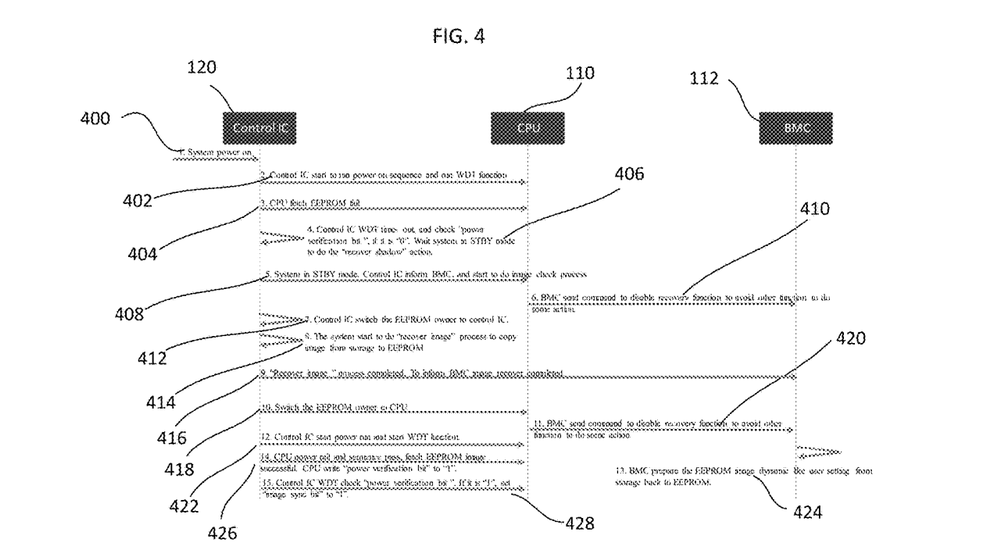
FIG. 4 is a flow diagram of the process performed by the computer device to recover a firmware image.

FIG. 4 is a flow diagram of the process performed by the CPU 110, the BMC 112, and the control circuit 120 (in FIG. 1), to recover the firmware image. When the device 100 (in FIG. 1) is powered up, the power on status indicates that the AC power is stable (400). The control circuit 120 starts the power on sequence, and the watch dog timer routine (402). The CPU 110 attempts to fetch the firmware image from the EEPROM 130 (404). If the fetch attempt fails, the watch dog timer routine run by the control circuit 120 will place the BIOS in a time-out. The control circuit 120 checks to determine if the power verification bit 142 is "0," indicating power is not in a normal state. The control circuit 120 waits for the device 100 to be placed in standby mode to initiate the recover image flow (406).

Once the device 100 is in standby mode, the control circuit 120 informs the baseboard management controller 112 that the control circuit 120 is initiating the image check process (408). The baseboard management controller 112 sends a command to disable the recovery function of the baseboard management controller 112 (410).

The control circuit 120 then switches the owner of the EEPROM 130 to the control circuit 120 (412). The control circuit 120 starts the recover image routine (414). The recovery image routine copies the firmware image from the storage device 134 to the EEPROM 130. The recovery image routine is detailed in relation to FIG. 7 below. When the recover image routine is completed, the control circuit 120 informs the BMC 112 that the image recover routine is completed (416). The control circuit 120 then switches the owner of the EEPROM 130 to the CPU 110 (418). The baseboard management controller 112 sends a command to enable the recovery function (420). The control circuit 120 then starts the power sequence and the watch dog timer routine (422). The baseboard management controller 112 sets the EEPROM dynamic setting to indicate the firmware image is stored back into the EEPROM 130 (424).

The platform control hub 136 then begins the power up sequence and starts the watch dog timer routine. The platform control hub 136 indicates the power is on to the CPU 110 and that the fetch image from the EEPROM 130 is successful. The CPU 110 then writes the power verification bit 142 (in FIG. 1) to a "1" (426). The control circuit 120 checks that the power verification bit 142 is set to "1." The control circuit 120 then sets the image sync bit 148 to "1" (428).

Figure 5:
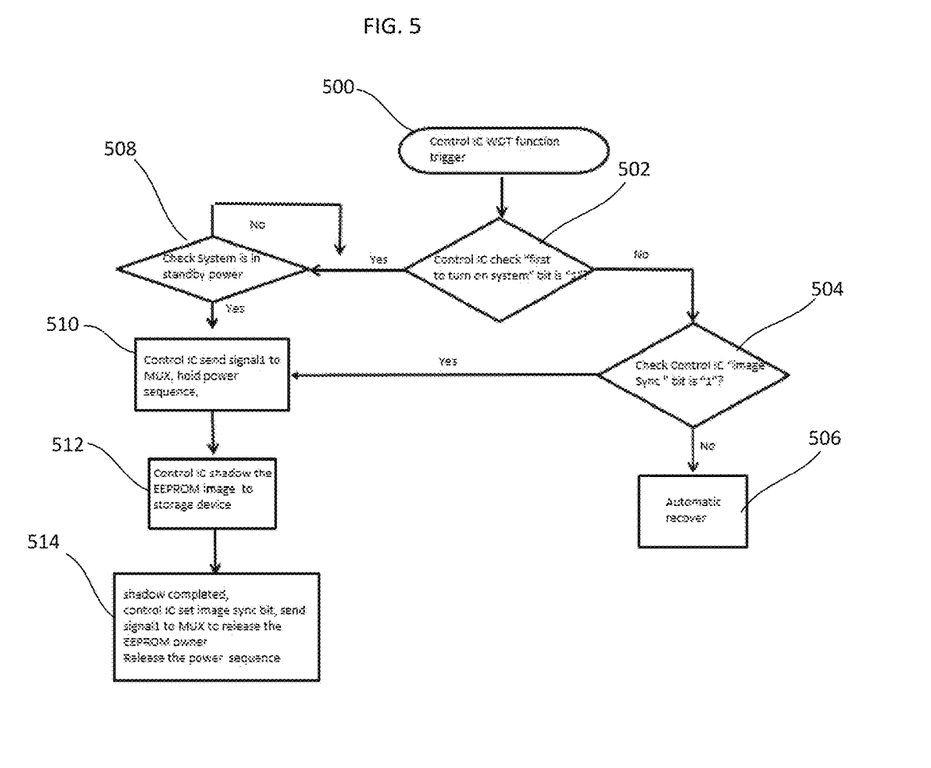
FIG. 5 is a flow diagram of the routine performed by the control circuit in FIG. 1 to create a shadow firmware image.

FIG. 5 is a flow diagram of the routine executed by the control circuit 120 (in FIG. 1) to create a shadow firmware image. The control circuit 120 first starts the power on sequence through the enable function of the watchdog timer routine (500). The control circuit 120 then checks whether a first to turn on system bit in the internal memory 140 (in FIG. 1) is set to "1" (502). If the first to turn on system bit is not set to "1," the control circuit 120 checks whether the image sync bit 148 is set to "1" (504). If the image sync bit is not set to "1," the control circuit 120 initiates the automatic recover routine detailed below in reference to FIG. 6 (506).

If, in step 502, the control circuit 120 determines the first to turn on system bit is set to "1," the control circuit 120 checks whether the device 100 is in standby power mode (508). If the device 100 is not in standby power mode (508), the control circuit 120 continues to check whether the device 100 is in standby power. After the control circuit 120 determines the device 100 has entered into standby power mode, the control circuit 120 sends a signal through the MUX 132 (in FIG. 1) to hold the power sequence (510). If the image sync bit 148 is set to "1" in step 504, the control circuit 120 also sends a signal through the MUX 132 to hold the power sequence (510). The control circuit 120 then creates a shadow copy of the firmware image stored in the EEPROM 130. The shadow copy of the firmware image is stored in the storage device 134 (512). Once the creation of the shadow copy of the firmware image is completed, the control circuit 120 sets the image sync bit 148 to "1." The control circuit 120 also sends a signal to the MUX 132 to release the owner of the EEPROM 130 from the control circuit 120. The control circuit 120 also releases the power sequence (514).

Figure 6:
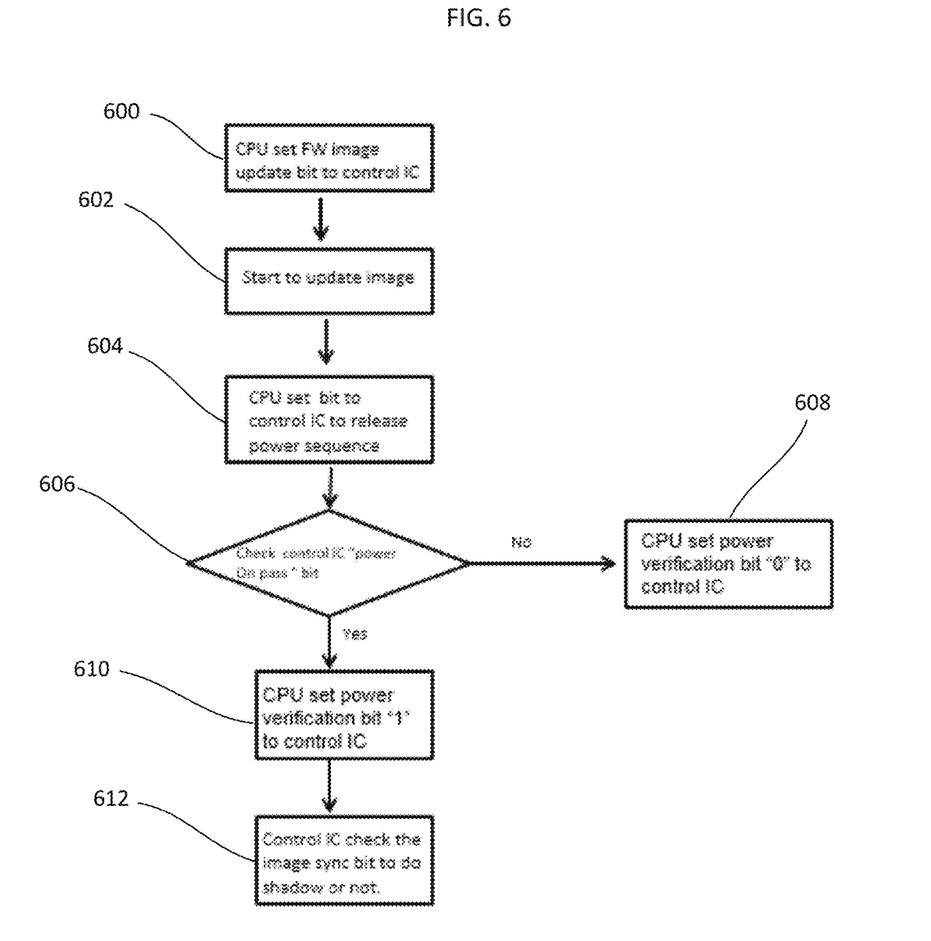
FIG. 6 is a flow diagram of the routine performed by the control circuit in FIG. 1 to update the firmware image.

FIG. 6 is a flow diagram of the routine executed by the control circuit 120 (in FIG. 1) to update the firmware image stored in the EEPROM 130. This routine is executed when the firmware image is changed or upgrades the firmware image are made available. The CPU 110 sets the firmware image update bit 150 in the internal memory 140 of the control circuit 120 to "1" to indicate an update is available (600). The control circuit 120 also sets the image sync bit 148 to "0" in the internal memory 140. The control circuit 120 then starts to update the firmware image stored in the EEPROM 130 (602). The updated firmware image is thus copied into the EEPROM 130. The CPU 110 sets a bit for the control circuit 120 to release the power sequence when the update to the firmware image is finished (604).

The CPU 110 checks whether a power on bit is set in the internal memory 140 (606). If the power on bit is not set, the CPU 110 sets the power verification bit 142 to "0," to indicate to the control circuit 120 that the power sequence has not been enabled with the updated firmware image (608). If the power on bit is set, the CPU 110 sets the power verification bit 142 (in FIG. 1) to "1," to indicate successful power on with the updated firmware image in the EEPROM 130 (610). The control circuit 120 then checks the image sync bit 148 to determine whether to perform the shadow image process described above in reference to FIG. 5 (612). If the image sync bit 148 is set to "0," the control circuit 120 waits for the system DC power to be turned off to perform the shadow image process as described above in reference to FIG. 5.

Figure 7:
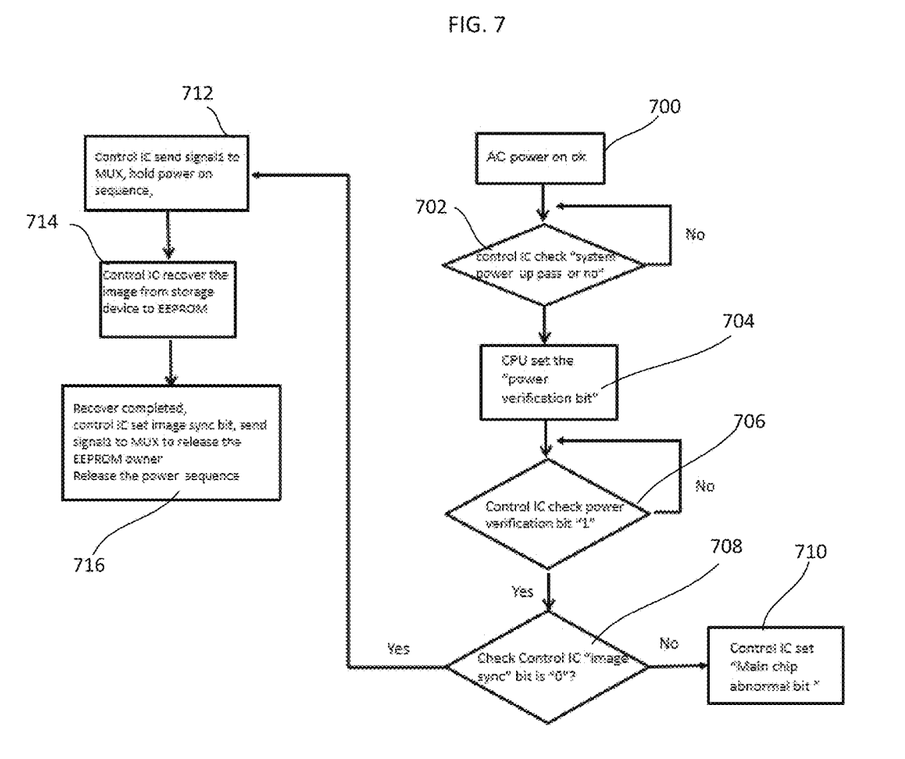
FIG. 7 is a flow diagram of the routine performed by the control circuit in FIG. 1 to recover the firmware image from a storage device.

FIG. 7 is the process allowing the control circuit 120 (in FIG. 1) to automatically recover the firmware image from the storage device 134. Thus, in the event the firmware image crashes on the EEPROM 130, the system can automatically recover the firmware image from the storage device 130. The CPU 110 (in FIG. 1) determines whether AC power is on (700). After the system determines whether the AC power is on, the system checks to determine if power is on to the control circuit 120 (702). If the power is not on to the control circuit 120, the CPU 110 loops back and continues to determine if power is on to the control circuit 120 (702). If the power is on to the control circuit 120, the CPU 110 sets the power verification bit 142 to "1" through the bus (704). The power verification bit 142 is set to "0" in all other circumstances. The control circuit 120 then checks whether the power verification bit 142 is set to "1" (706). If the power verification bit 142 is set to "0," a power on failure has occurred and the control circuit 120 loops back to continue to check the power verification bit 142. If the power verification bit 142 is set to "1," the control circuit 120 checks whether the image sync bit 148 is set to "0" (708). If the image sync bit 148 is set to "1", the control circuit 120 sets the main chip abnormal bit 146 to "1" (710).

If the image sync bit is "0" in step 708, the control circuit 120 sends a signal to the MUX 132 to select a read/write trace, and hold the power on sequence (712). The control circuit 120 then recovers the firmware image from the storage device 134 and copies the recovered firmware image to the EEPROM 130 (714). Once the recovery of the firmware image is completed on the EEPROM 130, the control circuit 120 sets the image sync bit 148 to "1" (716). The control circuit then signals to the MUX 132 to release the EEPROM owner, and release the power sequence.

In this example, the machine readable instructions of the routines in FIGS. 5, 6, and 7 comprise an algorithm for execution by: (a) a processor, (b) a controller, and/or (c) one or more other suitable processing device(s). The algorithm may be embodied in software stored on tangible media such as, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces could be implemented by software, hardware, and/or firmware. Also, some or all of the machine readable instructions represented by the flowcharts of FIGS. 5, 6, and 7 may be implemented manually. Further, although the example algorithm is described with reference to the flowcharts illustrated in FIGS. 5, 6, and 7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer; is typically of a non-transitory nature; and can include both volatile and nonvolatile media, removable, and non-removable media. By way of example, and not limitation, computer-readable storage media can be implemented in connection with any method or technology for storage of information, such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage, or other magnetic storage devices, or other tangible and/or non-transitory media that can be used to store desired information. Computer-readable storage media can be accessed by one or more local or remote computing devices, e.g., via access requests, queries, or other data retrieval protocols, for a variety of operations with respect to the information stored by the medium.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for recovering a firmware image in a computer device, the method comprising:
   creating a shadow firmware image in a storage device from a firmware image in non-volatile memory;
   determining whether a predetermined event affecting the firmware image has occurred;
   recovering, by a control circuit, the shadow firmware image from the storage device,
   wherein the control circuit includes an internal memory with an internal bit indicating the predetermined event;
   copying, by the control circuit, the shadow firmware image to the non-volatile memory;
   updating the firmware image in the non-volatile memory;
   determining whether the shadow firmware image is identical to the firmware image; and
   replacing the shadow firmware image in the storage device with the updated firmware image in the non-volatile memory,
   wherein a check sum of the shadow firmware image is determined, and
   a check sum of the firmware image is determined in determining whether the shadow firmware image is identical to the firmware image.

2. The method of claim 1, further comprising:
   sequencing power to a main chip; and
   accessing the firmware image via the main chip to operate the computer device.

3. The method of claim 2, wherein the main chip is one of a central processing unit, a baseboard management controller, or a micro-controller unit.

4. The method of claim 2, wherein the abnormal event is a lack of power to the main chip.

5. The method of claim 1, wherein the non-volatile memory is EEPROM.

6. The method of claim 1, wherein the recovering of the shadow firmware image and the copying of the shadow firmware image in the non-volatile memory is performed by a control circuit.

7. The method of claim 6, wherein the control circuit includes an internal memory with an internal bit indicating an abnormal event, and an internal bit indicating the shadow firmware image is different from the firmware image.

8. An electronic computer device, comprising:
   a non-volatile memory storing a firmware image;
   a main chip executing the firmware image;
   a storage device storing a shadow firmware image; and
   a control circuit operable to:
      create the shadow firmware image in a storage device from the firmware image in non-volatile memory;
      determine whether a predetermined event affecting the firmware image has occurred;
      recover the shadow firmware image from the storage device, wherein the control circuit includes an internal memory with an internal bit indicating the predetermined event;
      copy the shadow firmware image to the non-volatile memory;
      update the firmware image in the non-volatile memory;
      determine whether the shadow firmware image is identical to the firmware image; and
      replace the shadow firmware image in the storage device with the updated firmware image in the non-volatile memory,
      wherein the control circuit determines a check sum of the shadow firmware image a check sum of the firmware image to determine whether the shadow firmware image is identical to the firmware image.

9. The device of claim 8, wherein the control circuit is further operable to sequence power to a main chip, and access the firmware image via the main chip to operate the computer device.

10. The device of claim 9, wherein the main chip is one of a central processing unit, a baseboard management controller, or a micro-controller unit.

11. The device of claim 9, wherein the abnormal event is a lack of power to the main chip.

12. The device of claim 8, wherein the non-volatile memory is EEPROM.

13. The device of claim 8, wherein the control circuit includes an internal memory with an internal bit indicating an abnormal event, and an internal bit indicating the shadow firmware image is different from the firmware image.

* * * * *